United States Patent [19]
Luscombe et al.

[11] Patent Number: 5,712,828
[45] Date of Patent: Jan. 27, 1998

[54] HYDROPHONE GROUP SENSITIVITY TESTER

[75] Inventors: John Luscombe, Sugarland; Michael L. Maples, Houston, both of Tex.

[73] Assignee: Syntron, Inc., Houston, Tex.

[21] Appl. No.: 699,915

[22] Filed: Aug. 20, 1996

[51] Int. Cl.$^6$ ............................................... H04B 17/00
[52] U.S. Cl. ............................................................ 367/13
[58] Field of Search .................................. 367/13; 73/1.83

[56] References Cited

U.S. PATENT DOCUMENTS

| | | | |
|---|---|---|---|
| 3,859,620 | 1/1975 | Percy | 367/13 |
| 3,987,537 | 10/1976 | Warren | 29/592 |
| 4,223,397 | 9/1980 | Bakewel, Jr. et al. | 367/13 |
| 5,210,718 | 5/1993 | Bjelland et al. | 367/13 |

*Primary Examiner*—Daniel T. Pihulic
*Attorney, Agent, or Firm*—Gunn & Associates, P.C.

[57] ABSTRACT

A system for testing a group of hydrophones includes (a) a tank having a nozzle adapted for attachment of a streamer jacket; (b) a harness reel inside the tank for reversibly retaining a group of hydrophones; (c) fluid passage means into the tank for introducing and withdrawing fluid into and out of the tank; (d) an oscillating pump in fluid communication with the tank to introduce a time varying pressure pulse in the tank; (e) a reference hydrophone inside the tank; (f) electrical coupling means to couple a hydrophone signal from the group of hydrophones and the reference hydrophone to a central processing unit; and (g) means for comparing the hydrophone signal of the reference hydrophone to the hydrophone signal of the group of hydrophones. The means for comparing the hydrophone signal of the reference hydrophone to the signal from the group of hydrophones comprises a computer that determines the maximum signal strength and the fundamental frequency from the reference hydrophone, determines the maximum signal strength from the test array at the fundamental frequency, then calculates the sensitivity of the test array from the known sensitivity of the reference hydrophone.

8 Claims, 2 Drawing Sheets

HYDROPHONE GROUP SENSITIVITY TESTER

FIELD OF THE INVENTION

The present invention relates generally to the field of hydrophones used in seismic exploration over water and, more particularly, to a method and apparatus to test the sensitivity of a group of hydrophones.

BACKGROUND OF THE INVENTION

The present invention is applicable to testing the sensitivity of a section of hydrophones electrically connected to form part of a streamer. In operation, a ship tows one or more streamers astern. The streamer comprises a plurality of hydrophone elements grouped together in sections. To maintain the streamer in a known horizontal configuration, the streamer is followed by a tail buoy in a manner known in the art.

During seismic operations, the various hydrophone elements, in groups, receive return seismic signals, and it is therefore advantageous to predict the sensitivity of the groups of hydrophones in the streamer. The testing of this parameter of the hydrophone array is the focus of the present invention.

A seismic streamer is made up of many individual hydrophone elements. The hydrophone elements are generally electrically and mechanically coupled together to form a hydrophone group, and a number of groups of hydrophones are combined to form a section of hydrophone cable, typically 75 meters long. A number of sections may then combined to form the streamer, which may be thousands of meters long. In the current state of the art, multiple streamers may be towed behind a vessel to maximize the amount of seismic coverage for each pass during exploration.

Once a number of hydrophone elements has been electrically and mechanically coupled together to form a section, the section must be encased in a flexible, polymeric tube, known as a streamer jacket, and the streamer jacket filled with a fluid, such as oil or kerosene. The process of encasing the section of hydrophone elements is commonly carried out using a hydraulic tank called a squirter. This squirter system is described in detail in U.S. Pat. No. 3,987,537 to Warren, and incorporated herein by reference.

Individual hydrophone elements are commonly tested by the manufacturer for a variety of parameters, including the sensitivity of the hydrophone to a pressure signal. Unfortunately, due to manufacturing tolerances, the sensitivities of seemingly identical hydrophones may vary significantly. As previously mentioned, in practice, hydrophones are used in groups and thus the hydrophones in the groups may differ in sensitivity.

Further, characteristics of hydrophone elements and hydrophone arrays change over time and with use. Even if the sensitivity and other parameters of hydrophones and arrays were known when they are first deployed, these parameters invariably change after of period of use so that, when a hydrophone is removed from service for repair and maintenance the procedure for sensitivity testing must be repeated before the system is returned to service. Thus, there remains a need for a system and method of testing a hydrophone streamer during repair and maintenance procedures without the need to totally disassemble the array into individual hydrophone elements for testing.

Also, before a completed streamer section is shipped to a customer, it would be desirable to measure the sensitivity of the individual hydrophone groups as part of the final test procedure. This is not an easy task and several methods have been considered. The present invention includes the use of a pressurized tank.

One technique for expressing the sensitivity of a group of hydrophones is to accept the stated sensitivities provided by the manufacturer and to simply interpolate them for the group as a whole. This technique provides a coarse approximation and, with relatively slow data processing rates and relatively coarse resolution (i.e., bits per sample), has proved satisfactory. The error introduced by this interpolation technique was relatively insignificant compared to errors introduced in other parts of the overall seismic system. However, as digital signal processing has increased in speed and resolution, it has become increasingly critical to know the sensitivities of the groups of hydrophones that make up the streamers.

Another technique for testing the sensitivity of a group of hydrophones involves an additional step in the process of manufacturing hydrophone streamers. This involves taking a hydrophone section to a specially designed immersion tank, lowering the section into the tank, and subjecting the section to a pressure pulse or series of pressure pulses. This procedure adds an additional step in an already labor intensive manufacturing and assembly process, which necessarily cuts profit margin or makes the final product less cost competitive.

For particularly sensitive applications, some operators have conducted sensitivity testing at sea. In some cases, this may involve the application of seismic signals after the streamers have been deployed with the ship underway. This is a very time consuming and expensive use of a very expensive platform. Another commonly used testing procedure involves retracting the streamer onto the ship, placing the streamer in a basket, lowering the basket with the streamer over the side of the vessel, and subjecting the streamer to a seismic signal for testing. This is even more time consuming since the entire period that the vessel is dead in the water to test the streamer is lost productivity time. Each of these procedures also creates unnecessary opportunities for personnel hazards.

Thus, there remains a need for a method and apparatus for testing the sensitivity of a group of hydrophones, after such hydrophones have been assembled into a harness, such as initial assembly or for repair and maintenance of a used hydrophone streamer. Such a method and apparatus should not significantly impact the steps already in place for the manufacture of hydrophone streamers, but should provide a more accurate indication of the sensitivity of groups of hydrophones.

SUMMARY OF THE INVENTION

The present invention solves these and other drawbacks of the prior art by subjecting a hydrophone streamer to a sensitivity test as a part of the manufacturing and assembly process. The present invention may also be used for testing or verifying hydrophone array sensitivity during maintenance and repair.

In its simplest form, the present invention comprises a known harness injection system that has been modified to include a calibrated hydrophone. The injection system includes a tank in which a reel is mounted to receive a length of hydrophone cable and hydrophone elements. A pressure signal is created to induce a response in the calibrated reference hydrophone and the hydrophone string under test. The respective responses and compared and the sensitivity of the string under test is determined.

In order to measure the sensitivity of the test hydrophone group, it is necessary to know the intensity of an incident pressure wave. This can be measured by the reference hydrophone, provided the wave has the same intensity at the location of the hydrophone group and at the location of the reference hydrophone. If the separation of the locations is less than $0.05\lambda$, where $\lambda$ is the wavelength of the wave, then the effects due to wave interference, reflection, and refraction are negligible and the wave has an essentially uniform intensity everywhere in the tank.

For a speed of sound in water of 1,500 meters per second and frequencies in the range of 10 Hz to 100 Hz, the wavelengths are 150 meters to 15 meters. For a 2 meter tank, this criterion provides a maximum test frequency of 37.5 Hz.

If the sound source (i.e., the pressure wave) has a variable frequency and intensity, it is possible to measure the dependence of sensitivity on these variables. Control of the static pressure in the tank allows the dependence of sensitivity on depth to be measured.

The main source of error in the measurements in the present invention is the generation of vibration in the test tank. The tank must be completely full of liquid to prevent the generation of surface waves on the liquid. The tank itself must be heavily damped to prevent resonant vibration. The best way of doing this is to put the tank in the ground and surround it with a concrete jacket.

The sound generator does not need to be a low distortion source, but it does need to have a stable intensity and frequency. The most likely generation mechanism is a piston-driven pump, reciprocated by a motor with precision electronic control. This aspect of the present invention may include a means of controlling the throw of the piston. This may be accomplished by driving the piston with a linear electronic motor. It may be more cost-effective to provide a sound source with a variable frequency but constant intensity. As an example, for a six cubic meter tank, a piston diameter of five cm and a signal intensity of one mB, the throw of the piston is about one millimeter.

As previously described, a reference hydrophone is mounted within the pressure tank, and a hydrophone string under test is reeled into the tank. The test hydrophone section is wound on a reel inside the fluid-filled tank, which is then closed and pressurized. A source of low amplitude pressure waves provides a test sound signal, which is detected by the hydrophone groups and the reference hydrophone. The outputs are digitized and this data is processed and analyzed. Both the reference hydrophone and the test string are thus subjected to the same test sound signal and the resultant responses are captured for comparison.

If the sound signal contains harmonics of the fundamental frequency, there may be significant energy in the responses at frequencies higher than 37.5 Hz. These signals will not have a uniform intensity throughout the tank. It will be necessary to remove them by signal analysis such as by Fast Fourier Transform before the signal levels are determined. Frequency domain analysis is then used to determine the sensitivity of the test hydrophone string.

In summary, the system for testing a group of hydrophones includes (a) a tank having a nozzle adapted for attachment of a streamer jacket; (b) a harness reel inside the tank for reversibly retaining a group of hydrophones; (c) fluid passage means into the tank for introducing and withdrawing fluid into and out of the tank; (d) an oscillating pump in fluid communication with the tank to introduce a time varying pressure pulse in the tank; (e) a reference hydrophone inside the tank; (f) electrical coupling means to couple a hydrophone signal from the group of hydrophones and the reference hydrophone to a central processing unit; and (g) means for comparing the hydrophone signal of the reference hydrophone to the hydrophone signal of the group of hydrophones.

These and other features of the present invention will be apparent to those of skill in the art from a review of the following detailed description along with the accompanying drawings.

DETAILED DESCRIPTION OF A PREFERRED EMBODIMENT

Apparatus For Testing a Group of Hydrophones

Figure 1:
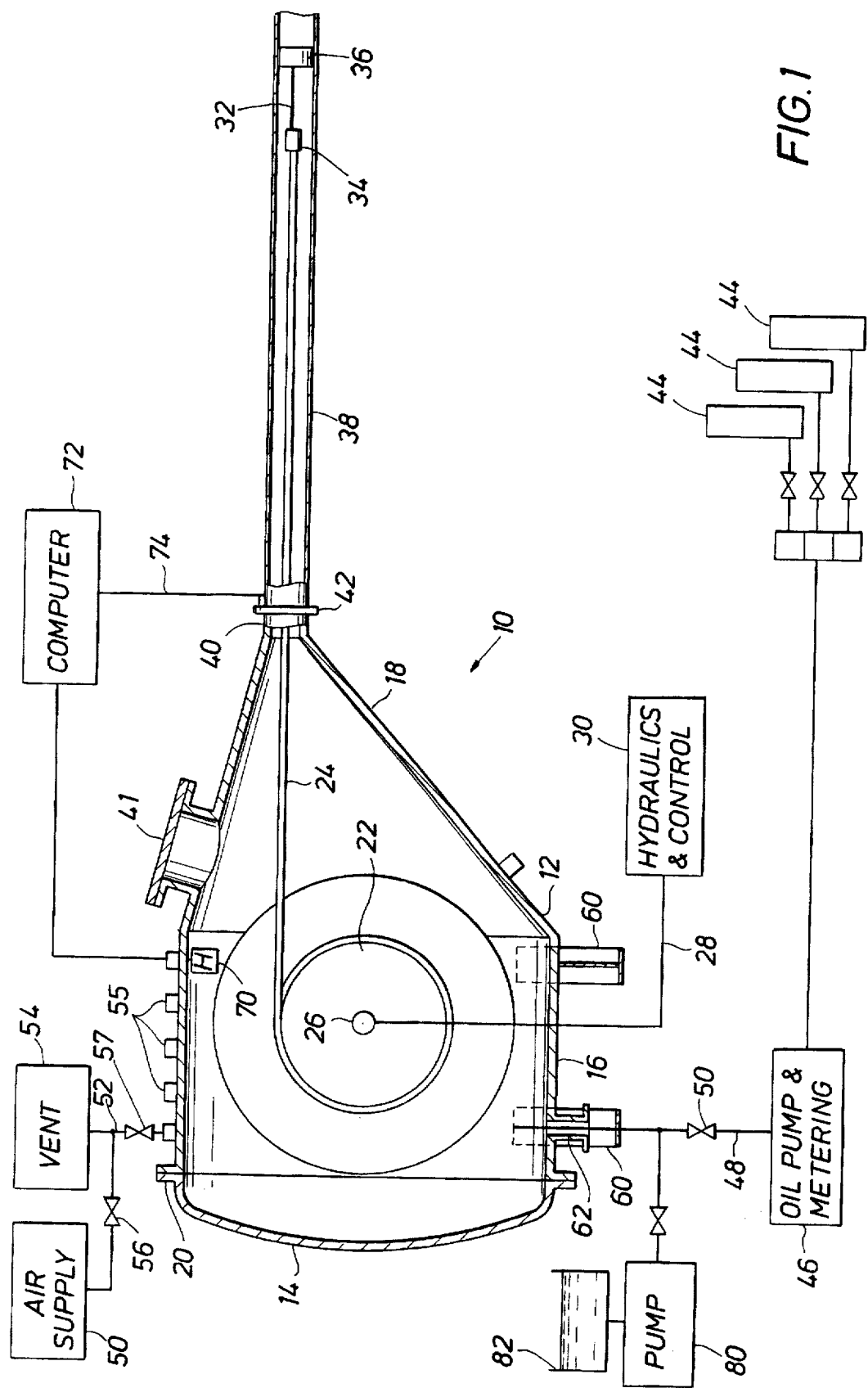
FIG. 1 is a schematic representation of the system of the present invention.

Referring now to FIG. 1, a partial section schematic of the apparatus 10 of the present invention is shown. The apparatus 10 includes a pressure vessel or reel tank 12 The pressure vessel 12 comprises primarily an end cover 14, a cylindrical body 16, and a tapered, roughly conical portion 18. The end cover 14 is preferably mounted on the cylindrical body 16 by a flange 20, for ease of assembly of and access to a reel 22. For the presently preferred embodiment, such a pressure vessel was obtained from Qualtec Engineering in Heanor, Derbyshire, England.

The reel 22 is mounted within the pressure vessel 12 to receive a section of a hydrophone harness 24, also referred to in the industry as the "carcass". The reel is preferably driven by a hydraulic motor 26. The motor is connected by a plural flow passage hydraulic cable 28 to a hydraulic power supply and control unit 30.

On the reel is wound the hydrophone harness 24. The harness 24 is connected to a tow line 32 by an eye 34. In turn, the tow line 32 is connected to the end of a pilot piston or "pig" 36. The piston 36 is fed into a streamer jacket 38 which is attached at one end to a nozzle 40. The other end of the harness 24 is secured at its other end to the reel 22 and the streamer jacket 38 is securely attached to the nozzle 40 by a clamp 42.

The pressure vessel 12 may also be provided with a view port 41 to permit visual access to the interior of the pressure vessel during various evolutions.

Fluid such as oil can be supplied to the pressure vessel 12 from any of several reservoirs 44 or the fluid may be returned to one of the reservoirs 44 by a pump and metering means 46 through a flow line 48 entering near the bottom of the tank 12 through a shutoff valve 50. Air can be supplied to the tank or allowed to vent from the tank, through flow line 52 connected to the top of the tank and to a vent 54. The flow line 52 connects through a gage valve 56 to an air supply 58 and the vent 54 via air/oil valve and gas means 57. Additional vents 55 may also be provided.

The pressure vessel 12 is preferably mounted on support legs 60. The pressure vessel also includes a drain connection 62, shown in phantom in FIG. 1 because it is hidden behind one of the legs. The drain connection 62 may be coupled to the fluid supply and return line 48, or these two components may be provided separately.

The foregoing description has focused on the apparatus that is provided to inject the hydrophone harness into the jacket. The following description now covers the basic additional components for carrying out the present invention for testing the sensitivity of a plurality of hydrophones in the harness while they are retained on the reel.

The system includes a standard or reference hydrophone 70 of precisely known sensitivity characteristics. The hydrophone 70, under pressure pulse conditions, provides a seismic signal to a computer 72. The computer 72 is also provided with a signal from the hydrophone harness 24 over a signal line 74.

The system further includes a pump 80 which provides a time-varying, periodic pressure pulse signal to the pressure vessel 12. The pump 80 may be provided with a head tank 82, or other means of supplying net positive suction head to the pump. The discharge of the pump 80 may tie into the supply and return line 48 or have its own penetration into the tank 12.

Method of Testing a Group of Hydrophones

Now having described the structure of a hydrophone group-sensitivity tester, the following description provides a step-by-step method of testing a group of hydrophones using the tester.

Once a group of hydrophone elements is assembled, for example in a 75 meter harness, in the conventional manner, it is mounted upon the reel 22 within the tank 12. At this point in the conventional assembly process, the jacket 38 is attached to the nozzle 40. However, before this is done in the process of the present invention, the data line 74 is attached to the end of the harness to begin the testing of the sensitivity of the group of hydrophones.

With the hydrophones in the harness 24 coupled to the computer 72 and the end of the nozzle sealed, the tank 12 is then filled from one or more of the reservoirs 44 using the pump and metering means 46. Trapped air or gas in the tank is simultaneously vented off through the vent 54. When the tank is full, the pump 80 is started to provide a time varying pressure pulse signal to the fluid within the tank. This pressure pulse signal is received by the reference hydrophone 70 and the hydrophones in the harness 24. The computer then compares the predetermined response from the reference hydrophone to the response from the hydrophones in the harness and determines the response characteristics of the test hydrophones in the harness.

Once the data has been collected, the data line 74 is uncoupled from the harness 24, the jacket 38 is attached to the nozzle 40, and the group of the hydrophones is inserted into the jacket in the manner described in the Warren '537 patent described above.

Sensitivity Determination of the Test Hydrophones

Figure 2:
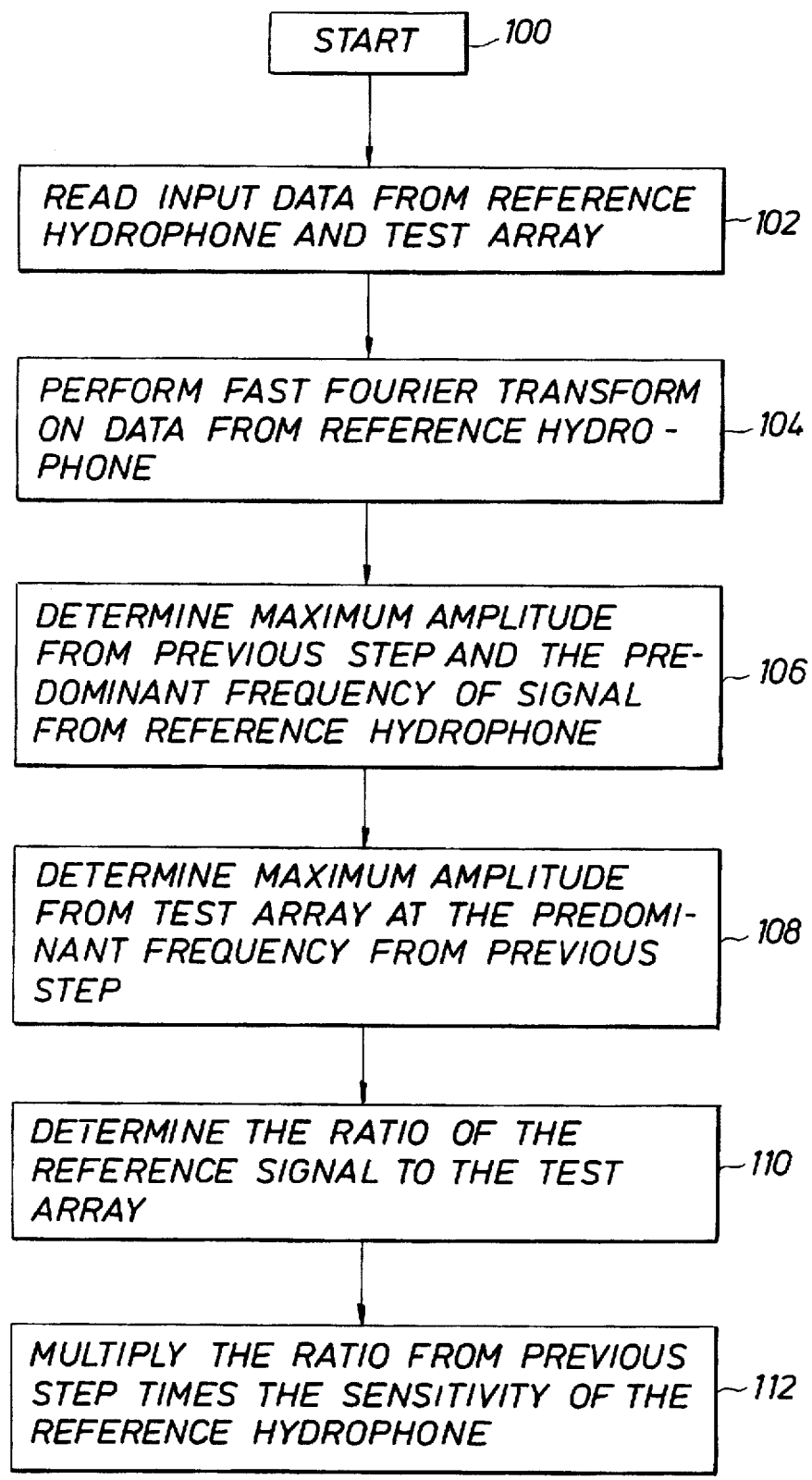
FIG. 2 is a logic flow diagram of the test procedure for determining the sensitivity of the hydrophone group under test.

FIG. 2 provides a logic flow diagram of the method of determining the sensitivity of the group of hydrophones under test. The method begins at step 100 and step 102 reads the input data from the reference hydrophone and the test array, as previously described. The data thus acquired will include a spectrum of responses over a range of frequencies, with voltage spikes at the fundamental and harmonic frequencies. Step 104 involves a fast fourier transform on the data from the reference hydrophone to capture this data in the frequency domain.

Step 106 then determines the maximum amplitude and predominant frequency (the fundamental frequency) from the FFT data from step 104. This step accomplishes two significant goals: it provides a maximum amplitude of the reference signal in relative terms; and it eliminates the interference of harmonics and noise contributions to the total energy acquired from the reference hydrophone. The method here employed is concerned with the ratio of the reference to the test array, and not with the absolute value of the fundamental signal from either the reference or the test array.

Now that the predominant frequency from the reference is known, step 108 determines the maximum (relative) amplitude of the signal from the test array at that frequency. Step 110 then takes the ratio of the signals from the reference hydrophone and the test array and, in step 112, the sensitivity of the test array is calculated by multiplying the ratio from step 110 by the known sensitivity of the reference hydrophone.

The principles, preferred embodiment, and mode of operation of the present invention have been described in the foregoing specification. This invention is not to be construed as limited to the particular forms disclosed, since these are regarded as illustrative rather than restrictive. Moreover, variations and changes may be made by those skilled in the art without departing from the spirit of the invention.

We claim:

1. A hydrophone-group sensitivity tester comprising:
   a tank having a nozzle adapted for attachment of a streamer jacket;
   a harness reel inside the tank for reversibly retaining a group of hydrophones;
   fluid passage means into the tank for introducing and withdrawing fluid into and out of the tank;
   an oscillating pump in fluid communication with the tank to introduce a time varying pressure pulse in the tank;
   a reference hydrophone inside the tank;
   electrical coupling means to couple a hydrophone signal from the group of hydrophones and the reference hydrophone to a central processing unit; and
   means for comparing the hydrophone signal of the reference hydrophone to the hydrophone signal of the group of hydrophones.

2. The tester of claim 1, wherein the means for comparing comprises a computer programmed to:
   read the signal of the reference hydrophone and the signal of the group of hydrophones, each of the signals in the form of data;
   perform a fast fourier transform on the data from the reference hydrophone;
   determine a maximum amplitude and predominant frequency of the data from the reference hydrophone;
   determine a maximum amplitude of the data from the group of hydrophones at the predominant frequency;
   calculate the ratio of the maximum amplitude from the reference hydrophone and the maximum amplitude from the group of hydrophones; and
   calculating the sensitivity of the group of hydrophones using the ratio.

3. A hydrophone test apparatus comprising:
   means for mounting a group of mechanically and electrically coupled hydrophone elements upon a reel within a pressure vessel, the pressure vessel including a nozzle for receiving the group of hydrophone elements;
   means for sealing the nozzle around the group of hydrophone elements, leaving the group of hydrophone elements accessible outside the pressure vessel;
   means for coupling the group of hydrophone elements to a computer;

means for coupling a reference hydrophone within the pressure vessel to the computer;

means for filling the pressure vessel with a fluid;

means for developing a time varying pressure signal within the pressure vessel that is detected by the reference hydrophone and the group of hydrophone elements to develop a reference signal from the reference hydrophone and a test signal from the group of hydrophone elements; and means for comparing the reference signal and the test signal to determine the response characteristics of the group of hydrophone elements.

4. The tester of claim 3, wherein the means for comparing comprises a computer programmed to:

read the signal of the reference hydrophone and the signal of the group of hydrophones, each of the signals in the form of data;

perform a fast fourier transform on the data from the reference hydrophone;

determine a maximum amplitude and predominant frequency of the data from the reference hydrophone;

determine a maximum amplitude of the data from the group of hydrophones at the predominant frequency;

calculate the ratio of the maximum amplitude from the reference hydrophone and the maximum amplitude from the group of hydrophones; and calculating the sensitivity of the group of hydrophones using the ratio.

5. A method of testing the response characteristics of a group of hydrophones comprising the steps of:

mounting a group of mechanically and electrically coupled hydrophone elements upon a reel within a pressure vessel, the pressure vessel including a nozzle for receiving the group of hydrophone elements;

sealing the nozzle around the group of hydrophone elements, leaving the group of hydrophone elements accessible outside the pressure vessel;

coupling the group of hydrophone elements to a computer;

coupling a reference hydrophone within the pressure vessel to the computer;

filling the pressure vessel with a fluid;

developing a time varying pressure signal within the pressure vessel that is detected by the reference hydrophone and the group of hydrophone elements to develop a reference signal from the reference hydrophone and a test signal from the group of hydrophone elements; and comparing the reference signal and the test signal to determine the response characteristics of the group of hydrophone elements.

6. The method of claim 5, wherein the step of comparing comprises the steps of:

reading the signal of the reference hydrophone and the signal of the group of hydrophones, each of the signals in the form of data;

performing a fast fourier transform on the data from the reference hydrophone;

determining a maximum amplitude and predominant frequency of the data from the reference hydrophone;

determining a maximum amplitude of the data from the group of hydrophones at the predominant frequency;

calculating the ratio of the maximum amplitude from the reference hydrophone and the maximum amplitude from the group of hydrophones; and calculating the sensitivity of the group of hydrophones using the ratio.

7. A method of testing the sensitivity of a group of hydrophones comprising the steps of:

reeling a hydrophone string into a tank having a nozzle;

electrically coupling the hydrophone string at the nozzle to a central processing unit;

coupling a reference hydrophone within the tank to the central processing unit;

filling the tank with a fluid to a predetermined pressure;

introducing a time varying pressure signal into the tank; and comparing the signal from the reference hydrophone to the signal from the hydrophone string.

8. The method of claim 7, wherein the step of comparing comprises the steps of:

reading the signal of the reference hydrophone and the signal of the group of hydrophones, each of the signals in the form of data;

performing a fast fourier transform on the data from the reference hydrophone;

determining a maximum amplitude and predominant frequency of the data from the reference hydrophone;

determining a maximum amplitude of the data from the group of hydrophones at the predominant frequency;

calculating the ratio of the maximum amplitude from the reference hydrophone and the maximum amplitude from the group of hydrophones; and calculating the sensitivity of the group of hydrophones using the ratio.

* * * * *